Patented June 23, 1931

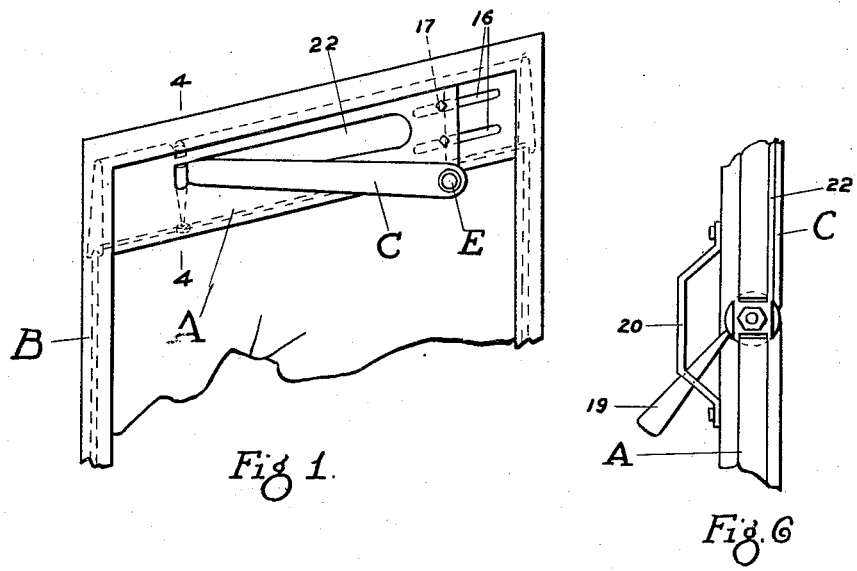
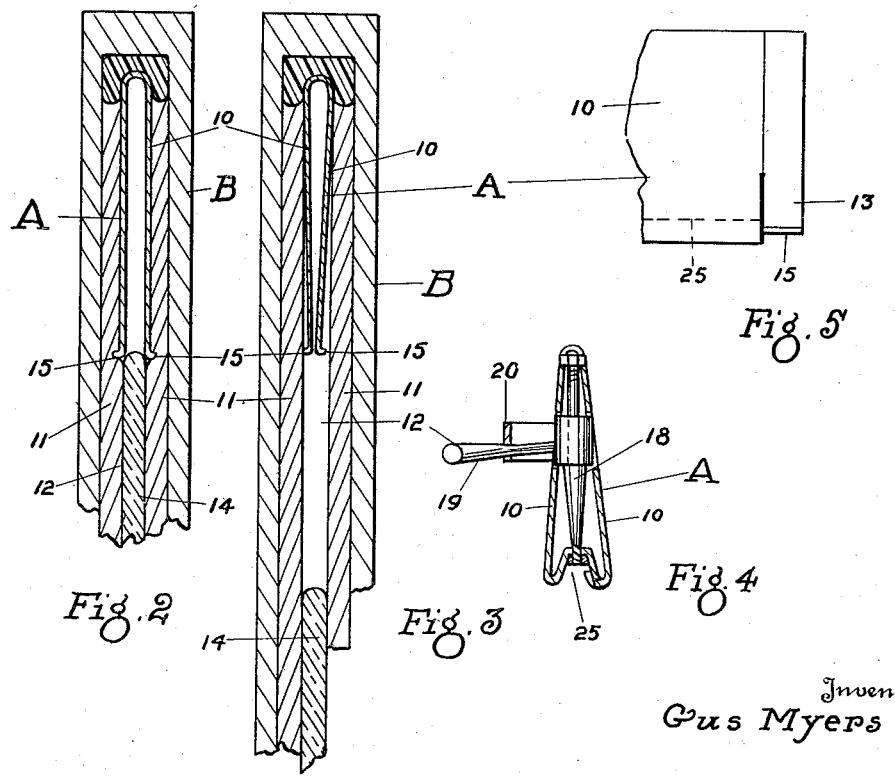

1,811,555

UNITED STATES PATENT OFFICE

GUS MYERS, OF FARGO, NORTH DAKOTA

AUTO SIGNAL

Application filed January 28, 1927. Serial No. 164,272.

My invention relates to a signal for automobiles and is designed to be positioned in the door frame or casing of the automobile in conjunction with the window or glass so as to operate when the window is closed or open. It is a primary feature of the invention to provide a simple and inexpensive signal device.

A feature of my invention resides in a spring frame member which fits in the channel wherein the glass of a door or window of an automobile is adapted to operate, thus having a flat, thin nature and being provided with a signal arm which is pivoted in a manner to be turned into operating position to signal the turning of an automobile.

It is an object of my invention to provide a flat, thin panel member which carries a signaling arm, the panel including means for engaging in the window or glass channel of the frame of an automobile in upper position in the frame or door of the automobile even when the glass is lowered away from the same so that the panel may remain in operative position and the window-pane may be lowered if it is desired. The panel is readily removable by pinching the same together to release the holding lugs on the end of the same.

These features, together with other objects and details of my invention will be more fully and clearly set forth in the specification and claims to fully describe the signaling device.

In the drawings forming part of my specification:

Figure 1 is a perspective view of a portion of an automobile frame or door illustrating my signal in operating position therein.

Figure 2 is an enlarged sectional detail of a portion of the same.

Figure 3 is a similar section to Figure 2, showing the parts in a different position.

Figure 4 is a section through the line 5—5 of Figure 1.

Figure 5 is a detail of the end portion of the signal panel.

Figure 6 is a detail of a portion of the panel showing the operating arm.

My signal panel A is of a flat, thin nature adapted to fit between the felt linings 11 in the channel portion 12 of the frame of the door B of an automobile or vehicle.

The panel A is of a thin nature practically having the formation on its end portions 13 of the approximately same thickness as the glass 14 of the window of the motor vehicle, which operates in the channel 12 of the frame B.

The end portions 13 are formed with outwardly projecting flange portions 15 at the bottom which are adapted to bite into the felt linings 11, as illustrated in Figure 2, when the sides of the ends 13 are expanded as illustrated in this figure.

The panel A is formed of spring material so that the sides may be squeezed together as illustrated in Figure 3 to release the biting edges of the flanges 15 from the felt lining 11 of the frame. This permits the panel which is formed with the downwardly depending side walls 10 to be removed or inserted in the channel 12 of a frame of an automobile door or window.

The panel A is formed in two portions, one of which is provided with longitudinally extending slots 16, as illustrated in Figure 1, while the other portion is provided with bolts 17 which extend through the holes formed in this section and through the slot 16 to hold the parts of the panel A adjustable so that the panel A may be adjusted for different widths of windows or doors. This permits my signal panel A to be readily fitted to different sized doors by changing the length of the same.

I provide a signal blade B which is adapted to be supported by the bolt 18 which extends through the panel A as illustrated in Figure 4 between the sides 10 of the same. By means of a suitable operating handle 19 which engages against the quadrant 20 in suitable recesses formed for the same, the signal blade C can be operated to turn the same outwardly into signaling position. The signal blade C is illustrated partly turned into outer signaling position in Figure 1.

In Figure 6 I have illustrated a portion of the signaling blade C extending along one side of the wall 10 of the panel A and the panel is recessed at 22 in a manner so as to permit the signal to lie flush with the outer surface of the panel A. The recessed portion 22 is also illustrated in Figure 1 of the drawings.

I prefer to have the signal surface of the blade C of a color which is easily distinguishable when the blade C is turned out into signaling position, and this may be of a solid color such as yellow, or may be of several colors, such as black and white, as are used on railway crossings, or of a red. But I prefer to have the color of a striking nature so that the signal will be readily apparent when it is turned out into signaling position in the daytime.

So that the signal may be more apparent at night I have provided a signal light E in the outer end of the blade C which is of ordinary well known construction having an electric light within the same and being connected to the necessary source of electrical energy to light the same when the arm is turned out into signaling position. I have not illustrated the electrical connections of the signal light E as these are well known in the art, but I desire to have it understood that such a signal light may be readily employed in my signal blade C.

A feature of my invention is the simplicity of the signal panel A which is of a flat, thin nature, designed to be positioned within the narrow channel 12 where the glass 14 slides up and down and by means of the holding flanges 15 the panel A is held in operating position preferably at the top of the window frame or door B. These holding flanges permit the glass to be turned away from the signal panel A. I provide a glass receiving channel portion 25 along the lower edge of the center portion of the panel A as illustrated in Figure 4 and in Figure 5, so that the glass may fit up into the panel when the same is turned up into closed position. This permits the glass to be closed tightly against the signal panel when it is desired.

The simple, inexpensive structure provided by my signal panel is quite apparent and its means of holding itself in position by the spring nature of the side walls 10, together with the biting edges 15 are of importance. I have found my signal to be very practical in use.

In accordance with the patent statutes I have described the principles of operation of my signal and while I have illustrated a particular formation and construction in the drawings, I desire to have it understood that variations may be made in the design and construction without departing from the spirit of the invention within the scope of the following claims.

I claim:

1. A signal for vehicles adapted to be positioned in the window pane channel including, a panel, spring means adapted to expand the thickness of a portion of said panel into the side edges of the channel in a manner to hold said signal in operative position when the window is up or down.

2. A signal for vehicles including, side walls of a spring-like nature, end flanges formed on said side walls adapted to extend outwardly in a manner so as to bite into a felt lining of a window frame when they are expanded to hold said signal in operative position.

3. An adjustable signal panel for motor vehicles adapted to be positioned in a window frame including, a signalling blade, means for pivotally supporting said blade to extend the same into and out of operating position, means for adjusting the length of the panel, and means for expanding the thickness of a portion of said panel under spring tension to engage the side of the window pane groove in said frame.

4. A signal for automobiles including, a panel body portion having spring sides, end portions formed on said sides adapted to expand into position to engage to hold the panel in operative position at the top of a glass channel of a motor vehicle frame, a signal arm adapted to be received in one side of said panel, an operating lever on the other side of said panel, and a quadrant for holding the operating arm in set position.

5. A signal for the window frame of a motor vehicle including, a panel, means for supporting said panel in the glass channel of the motor vehicle when the glass is up or down, means for receiving the glass to close the channel, a signal blade, and means for operating the signal blade.

6. A signal for motor vehicles including, a panel adapted to be positioned in a window frame, holding flanges on a portion at each end of said panel, means for expanding the thickness of said portion of said panel to force said holding flanges into the side edges of the glass channel of the window frame to support the panel in a set position therein, a signal member, means for operating said signal member to project from said panel, and means for adjusting the length of the panel.

GUS MYERS.